United States Patent
Grant (10) Patent No.: US 7,904,489 B2
(45) Date of Patent: Mar. 8, 2011

(54) DATABASE UNLOAD/RELOAD OF PARTITIONED TABLES

(75) Inventor: Bryan G. Grant, Veseli, MN (US)

(73) Assignee: Target Brands, Inc., Minneapolis, MN (US)

( * ) Notice: Subject to any disclaimer, the term of this patent is extended or adjusted under 35 U.S.C. 154(b) by 532 days.

(21) Appl. No.: 12/118,094

(22) Filed: May 9, 2008

(65) Prior Publication Data

US 2009/0282055 A1 Nov. 12, 2009

(51) Int. Cl.
G06F 7/00 (2006.01)
G06F 17/30 (2006.01)
(52) U.S. Cl. .......................................... 707/803; 707/809
(58) Field of Classification Search ................ 707/803
See application file for complete search history.

(56) References Cited

U.S. PATENT DOCUMENTS

| | | | |
|---|---|---|---|
| 6,920,563 B2 | 7/2005 | Kohl et al. | 713/189 |
| 7,093,137 B1 * | 8/2006 | Sato et al. | 713/193 |
| 7,111,005 B1 * | 9/2006 | Wessman | 1/1 |
| 7,266,699 B2 * | 9/2007 | Newman et al. | 713/182 |
| 7,797,342 B2 * | 9/2010 | Banks et al. | 707/783 |
| 7,827,403 B2 * | 11/2010 | Wong et al. | 713/168 |
| 2001/0034704 A1 * | 10/2001 | Farhat et al. | 705/39 |
| 2004/0255133 A1 * | 12/2004 | Lei et al. | 713/193 |
| 2007/0074047 A1 * | 3/2007 | Metzger et al. | 713/193 |
| 2007/0079119 A1 | 4/2007 | Mattsson et al. | 713/164 |
| 2007/0214167 A1 | 9/2007 | Nair et al. | 707/101 |

FOREIGN PATENT DOCUMENTS

WO WO-01/35226 5/2001

OTHER PUBLICATIONS

DB2 Portal Blog, "Update Schema and Catmaint [DB2 9 for z/OS]," http://www.db2portal.com/labels/DB2%209.html, 67 pages, (last visited Dec. 18, 2007).

* cited by examiner

*Primary Examiner* — Kuen S Lu
*Assistant Examiner* — Binh V Ho
(74) *Attorney, Agent, or Firm* — Theodore M. Magee; Westman, Champlin & Kelly, P.A.

(57) ABSTRACT

Values stored in partitioned tables are unloaded into files with one partition per file using a database unload utility. This utility forms a punch file that includes instructions to perform a load of data from the unloaded files into the partitioned table. The punch file is read to determine the names of the unloaded files. These names are altered to form new files. Values in the unloaded files are modified and the modified values are written to the new files. A new punch file is created that is more efficient than the initial punch file and that allows data in the partitioned table to be replaced on a partition basis with the data in the new files. The new punch file is then executed to load the modified values in the new files into the partitioned table.

17 Claims, 5 Drawing Sheets

```
                    300       304              306                              214
                      ╲        ╱                ╱                                ╱
                       TEMPLATE BSUG27XO
        302              DSN('SDIS.NT.SDXC0001.UNLD.SPSDX10.P&PA.')
            ╲            DISP(OLD,KEEP,KEEP)
                     LOAD DATA                  LOG NO   RESUME YES
          316          EBCDIC   CCSID(00037,00000,00000)
             ╲         SORTKEYS              190512963
                     INTO TABLE "DB2CEDS"."ENCRP_DATA_TNDR"
                     PART 00001 INDDN BSUG27XO                     ─── 322
          318 ─      WHEN(00001:00002) = X'0003'
                     (  "REF_I"                                    ─── 320
          308             POSITION(  00003:00009) DECIMAL
                     ,  "ENCRP_DATA_I"
                            POSITION(  00010:00041) CHAR(00032)
                     ,  "PARTN_I"
                            POSITION(  00042:00043) SMALLINT
                     )
                     INTO TABLE "DB2CEDS"."ENCRP_DATA_TNDR"
                     PART 00002 INDDN BSUG27XO
                     WHEN(00001:00002) = X'0003'
                     (  "REF_I"
          310             POSITION(  00003:00009) DECIMAL
                     ,  "ENCRP_DATA_I"
                            POSITION(  00010:00041) CHAR(00032)
                     ,  "PARTN_I"
                            POSITION(  00042:00043) SMALLINT
                     )
                     INTO TABLE "DB2CEDS"."ENCRP_DATA_TNDR"
                     PART 00003 INDDN BSUG27XO
                     WHEN(00001:00002) = X'0003'
                     (  "REF_I"
          312             POSITION(  00003:00009) DECIMAL
                     ,  "ENCRP_DATA_I"
                            POSITION(  00010:00041) CHAR(00032)
                     ,  "PARTN_I"
                            POSITION(  00042:00043) SMALLINT
                     )
                     INTO TABLE "DB2CEDS"."ENCRP_DATA_TNDR"
                     PART 00004 INDDN BSUG27XO
                     WHEN(00001:00002) = X'0003'
                     (  "REF_I"
          314             POSITION(  00003:00009) DECIMAL
                     ,  "ENCRP_DATA_I"
                            POSITION(  00010:00041) CHAR(00032)
                     ,  "PARTN_I"
                            POSITION(  00042:00043) SMALLINT
                     )
```

FIG. 3

```
TEMPLATE CEDSLD00
     DSN('SDIS.NT.SDXC0001.LOAD.SPSDX10.P&PA.')
     DISP(OLD,KEEP,KEEP)
LOAD DATA LOG NO NOCOPYPEND STATISTICS TABLE(ALL) INDEX(ALL)
  INTO TABLE "DB2CEDS"."ENCRP_DATA_TNDR" PART 00001 INDDN CEDSLD00
     REPLACE REUSE
  INTO TABLE "DB2CEDS"."ENCRP_DATA_TNDR" PART 00002 INDDN CEDSLD00
     REPLACE REUSE
  INTO TABLE "DB2CEDS"."ENCRP_DATA_TNDR" PART 00003 INDDN CEDSLD00
     REPLACE REUSE
  INTO TABLE "DB2CEDS"."ENCRP_DATA_TNDR" PART 00004 INDDN CEDSLD00
     REPLACE REUSE
```

DATABASE UNLOAD/RELOAD OF PARTITIONED TABLES

BACKGROUND

In order to secure data, it is common to encrypt the data and store it in a database. Such encryption is typically based on an encryption algorithm that utilizes an encryption key. Since encryption keys may be discovered, a common security policy requires periodic re-encryption of the data using a new encryption key so that a one-time discovery of an encryption key does not lead to life-time access to the data. In order to perform such a re-encryption, the stored encrypted values must be read from the database, decrypted using the old encryption key, re-encrypted using the new encryption key and re-written to the database. For very large data sets, this process can be extremely time consuming and require a large amount of computing resources.

International Business Machines (IBM) provides a database program known as DB2. This program includes a utility, known as the UNLOAD utility, for reading data from a database into a dataset or file and a utility, known as the LOAD utility, for writing data from a dataset or file to a database. In addition, DB2 provides a mechanism for unloading separate partitions of a table into separate datasets using a TEMPLATE utility in combination with the UNLOAD utility. The TEMPLATE utility instruction designates a filename template that includes a variable for the partition number. The UNLOAD utility instruction designates a range of partition values that are to be unloaded and includes a reference to the template utility instruction. During execution of the UNLOAD utility, the reference to the TEMPLATE utility causes the filename template of the TEMPLATE utility to be retrieved. For each partition in the partition range, the partition variable is replaced with the partition value to form a filename. A file with the resulting filename is then created and the data for the partitions is unloaded into the respective files.

The TEMPLATE utility can also be used with the LOAD utility. When used with the LOAD utility, the TEMPLATE utility instruction designates a filename template that includes a variable for the partition number. A separate portion of the LOAD utility instruction is then provided for each partition. Each portion of the LOAD utility instruction includes a reference to the TEMPLATE utility and a partition number. When a LOAD utility instruction is executed, the references to the TEMPLATE utility instruction are used to retrieve the filename template and to replace the partition variable in the filename template with the partition number of that portion of the LOAD utility instruction. The resulting filenames are then used as the input files from which data is loaded into the partitions of the table.

As part of the UNLOAD utility, a PUNCH file is created that includes LOAD utility instructions for reloading the data that is unloaded into the datasets back into the partitions of the table. Many of the parameters in the LOAD utility instructions of the PUNCH file are controlled by the UNLOAD utility internally and cannot be designated when executing the UNLOAD utility instruction.

The discussion above is merely provided for general background information and is not intended to be used as an aid in determining the scope of the claimed subject matter.

SUMMARY

Values stored in partitioned tables are unloaded into files with one partition per file using a database unload utility. This utility forms a punch file that includes instructions to perform a load of data from the unloaded files into the partitioned table. The punch file is read to determine the names of the unloaded files. These names are altered to form new files. Values in the unloaded files are modified and the modified values are written to the new files. A new punch file is created that is more efficient than the initial punch file and that allows data in the partitioned table to be replaced on a partition basis with the data in the new files. The new punch file is then executed to load the modified values in the new files into the partitioned table.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In embodiments described herein, encrypted values stored in partitioned tables are unloaded into files, with one partition per file using a database unload utility. This utility forms a punch file that includes instructions to perform a load of data from the unloaded files into the partitioned table. Instructions provided in the punch file, however, are inefficient and do not allow data changed in the unloaded files to replace data currently existing in the partitioned table. To overcome this, embodiments described herein read the punch file to determine the names of the unloaded files. These names are altered to form new files. The encrypted data in the unloaded files is decrypted using an old encryption key, re-encrypted using a new encryption key and written to the new files. A new punch file is created that is more efficient than the initial punch file and that allows data in the partitioned table to be replaced on a partition basis with the data in the new files.

Figure 1:
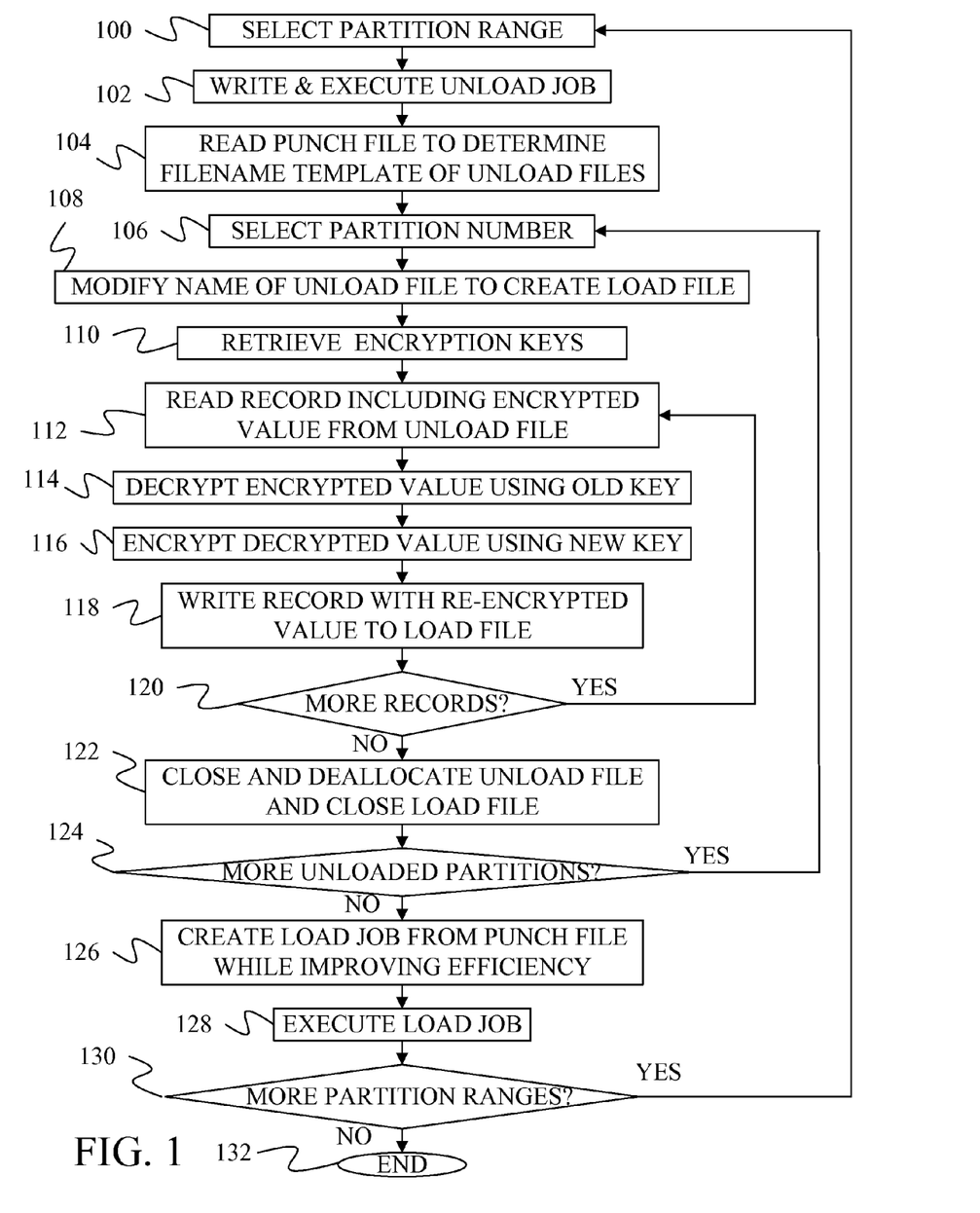
FIG. 1 is a flow diagram of a method of unloading and loading partitioned tables.
Figure 2:
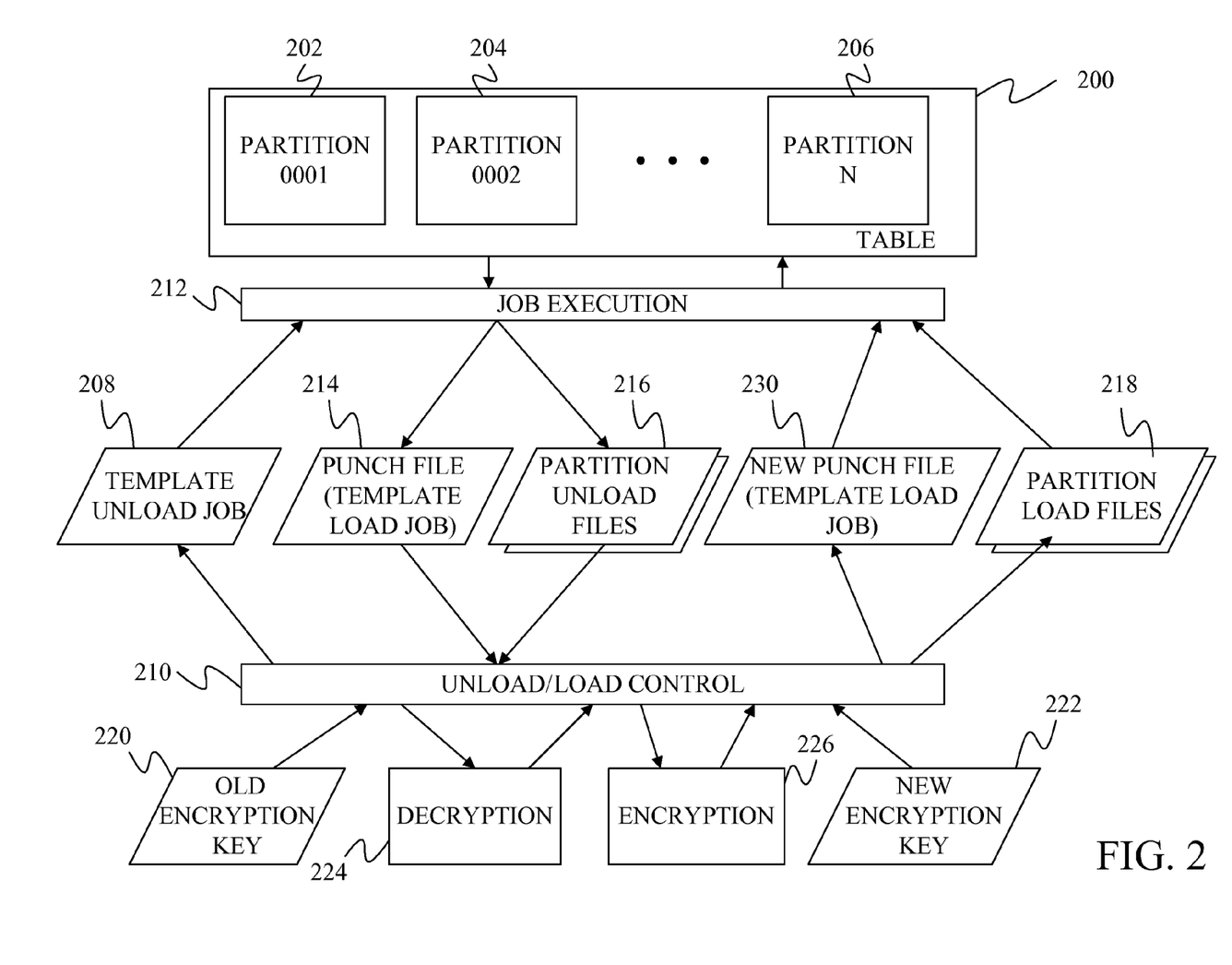
FIG. 2 is a block diagram of elements used in the method of FIG. 1.

FIG. 1 provides a flow diagram for unloading encrypted values from a partitioned table, re-encrypting the values and reloading the re-encrypted values to the partitioned table. FIG. 2 provides a block diagram of elements used in the method of FIG. 1.

In FIGS. 1 and 2, a table 200 is divided into n partitions such as partitions 202, 204 and 206. The records in each partition are unloaded into a separate unload file. The records in the unload file are than accessed to retrieve an encrypted value that is decrypted using an old encryption key and re-encrypted using a new encryption key. Records containing the new values are written to load files, with a separate file for each partition. The records of the load files are then loaded into the partitions of table 200.

In step 100 of FIG. 1, a partition range is selected. The UNLOAD database utility can unload multiple partitions with a single unload command. However, as the number of partitions being unloaded increases, the speed of the unload command decreases. As such, under several embodiments, the partitions are broken into sets of ranges. For example, if there are 1000 partitions in table 200, ten sets of 100 partitions each can be formed. Step 100 involves selecting the partition range of one of the sets.

At step 102, the selected partition range is used to write and execute a TEMPLATE-UNLOAD job 208. An example of a TEMPLATE-UNLOAD job is provided below:

```
//****************************************************************
//STEP000B EXEC DB2TUTLL,CONDCDE=4
//****************************************************************
//SYSPUNCH DD DSN=SPTT.NTU.ULDDB2T.SYSPUNCH,
//DISP=(NEW,CATLG,CATLG)
//UNIT=SYSDA,SPACE=(TRK,(1,1))
//SYSPRINT DD SYSOUT=*
//SYSIN DD *
  TEMPLATE UNLDDS DSN SPTT.NTU.ULDDB2T.&TS..U&PART.
    UNIT SYSDA DISP (NEW,CATLG,CATLG) SPACE (20,50) CYL
  UNLOAD TABLESPACE DB2PROD.SPSDX10 PART 001:020
    UNLDDN UNLDDS
    FROM TABLE DB2PROD.ENCRP_DATA_TNDR
    SHRLEVEL CHANGE
/*
```

In the TEMPLATE-UNLOAD job described above, instruction "STEP000B EXEC DB2TUTLL, CONDCDE=4" identifies a utility control program that will be used to execute the database utilities listed in the job. The instruction "SYSPUNCH DD DSN=SPTT.NTU.ULDDB2T.SYSPUNCH" defines a file that will receive punch file information that describes template load instructions for loading the files that are unloaded back into the table partitions. The line "SYSPRINT DD SYSOUT=*" indicates that there is no output file. The line "SYSIN DD *" indicates that the lines after that line contain utilities that will be input to the control program DB2TUTLL.

The lines

```
TEMPLATE UNLDDS DSN SPTT.NTU.ULDDB2T.&TS..U&PART.
  UNIT SYSDA DISP (NEW,CATLG,CATLG) SPACE (20,50) CYL
``` represent a TEMPLATE utility instruction that is referred to by the name UNLDDS and that designates a filename template, SPTT.NTU.ULDDB2T.&TS.U&PART., for the output files that are formed through the UNLOAD utility instruction. The filename template includes two variables that each begin with an ampersand. The first variable is &TS which represents the table space that is being unloaded and &PART which indicates the partition that is being unloaded. For example, for partition 0001 and table space DB2PROD.SPSDX10 the filename of the file that will receive this partition is SPTT.NTU.ULDDB2T.DB2PROD.SPSDX10.U0001.

The lines:

```
UNLOAD TABLESPACE DB2PROD.SPSDX10 PART 001:020
  UNLDDN UNLDDS
  FROM TABLE DB2PROD.ENCRP_DATA_TNDR
  SHRLEVEL CHANGE
``` represent an UNLOAD utility instruction for unloading partitions 001-020 of the table DB2PROD.ENCRYP_DATA_TNDR from table space DB2PROD.SPSDX10 into the filenames indicated by the template UNLDDS described above. The partitions range 001:020 is indicated after the PART keyword and the table to be unloaded is indicated after the "FROM TABLE" statement. The UNLDDN keyword is followed by the template name UNLDDS, and indicates that the filename template in template UNLDDS should be used to identify the filenames for the unload files that will receive the data from the table partitions.

TEMPLATE-UNLOAD job 208 is provided by unload/load control program 210 to job execution module 212, which interprets the instructions in TEMPLATE-UNLOAD job 208 and executes the instructions against the partitions of table 200.

When executed, the TEMPLATE and UNLOAD utilities described above form punch file 214 and partition unload files 216. In the example above, punch file 214 is defined in the "SYSPUNCH" line as SPTT.NTU.ULDDB2T.SYSPUNCH. The partition unload files 216 are a set of files with one file for each partition of table 200 that was unloaded in the TEMPLATE-UNLOAD job 208. Each partition unload file includes its partition as part of its name as indicated above and each partition unload file includes the records unloaded from the corresponding partition of the table.

Punch file 214 defines instructions for a TEMPLATE-LOAD job that will load data from the partition unload files 216 back into the partitions of table 200. In the International Business Machines (IBM) DB2 system, punch file 214 is automatically created by the system and many of the parameters returned in punch file 214 cannot be controlled through TEMPLATE-UNLOAD job 208.

Figure 3:
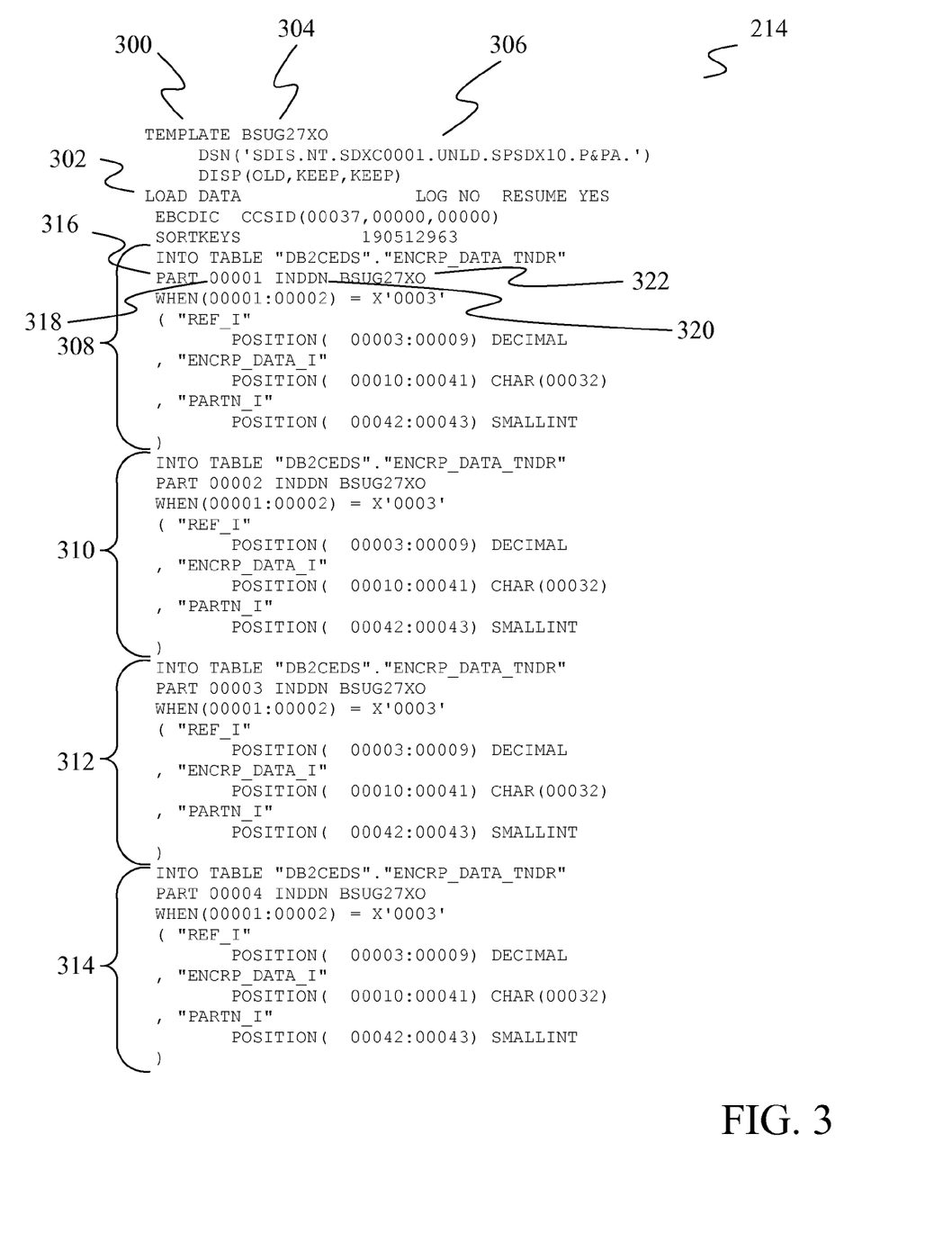
FIG. 3 is an example of a punch file formed by an unload utility.

FIG. 3 provides an example of punch file 214 produced by an unload of partitions 00001-00004 of a table DB2CEDS.ENCRP_DATA_TNDR. In FIG. 3, punch file 214 includes TEMPLATE instruction 300 and LOAD instruction 302. Template instruction 300 includes a template reference name 304 and a filename template 306 that defines the template of the names of the partition file to be loaded into the table. Filename template 306 includes a variable designated as &PA, which is replaced with the partition numbers designated in the LOAD instruction 302.

For each partition, LOAD instruction 302 includes an INTO TABLE instruction such as INTO TABLE instruction 308, INTO TABLE instruction 310, INTO TABLE instruction 312 and INTO TABLE instruction 314. Each INTO TABLE instruction identifies a table that the data into which the file is to be uploaded. In FIG. 3, each of the INTO TABLE instructions indicates the table name is DB2CEDSD.ENCRP_DATA_TNDR. Each INTO TABLE instruction also includes a partition keyword, PART, such as partition keyword 316 of INTO TABLE instruction 308, that is followed by a partition number such as partition number 318 of INTO TABLE instruction 308. This partition number indicates into which partition of the table the data should be uploaded and provides the partition number that is placed in the filename template to identify the input file for uploading. Each INTO TABLE instruction also includes an input data name indicator such as INTO TABLE indicator 320, which is followed by a reference to the name 304 of template 300, such as template name 322 of INTO TABLE instruction 308. This reference to the template name causes the template name to be replaced with the filename 306 set in that template while inserting the partition number 318 in place of the &PA variable in the filename. This filename represents the file that is to be uploaded into the partition of the table. Thus, each partition will have a different filename corresponding to a different file that is to be uploaded into the partition.

Punch file 214 also includes WHEN statements in each INTO TABLE instruction. These WHEN statements are designed by DB2 to ensure that the data that is to be uploaded back into the partition tables is in the same format as the data that was unloaded from the tables. However, such WHEN statements are inefficient since they require each piece of data to be evaluated during upload. In addition, the punch file 214 produced by the UNLOAD utility does not indicate that the data in the files should replace the data that currently exists in the partitions during the loading of the data. As a result, if the punch file 214 is used directly to reload data into the partitions of the table, the data will be added to the end of the partitions of the table instead of replacing existing data.

As shown above, unload/load control 210 sets the names of the partition unload files 216 using the template filename and the partition range. However, for security purposes, unload/load control 210 does not maintain the names of the partition unload files 216 after creating TEMPLATE-UNLOAD job 208. Instead, unload/load control 210 reads the filename template in punch file 214 at step 104 and reads a partition number from an INTO TABLE statement in punch file 214 at step 106. This information can then be used to determine the name of an unload partition unload file.

At step 108, unload/load control program 110 uses the filename template and the partition number to create a name for one of a set of new partition load files 218 and to create the new partition load file 218 with that name. In particular, unload/load control 210 modifies the filename template and replaces the &PA variable with the partition number to define the name of the partition load file 218. Under one embodiment, modifying the filename template involves changing the designation UNLD in the filename template to LOAD, for example. In other embodiments, the template filename may be modified by replacing other parts of template filename 306, removing portions of the template filename 306, adding portions to the template filename 306, or forming a completely different template filename. Unload/load control 210 then forms partition load file 218 with the modified filename.

At step 110, unload/load control 210 retrieves an old encryption key 220 and a new encryption key 222. Old encryption key 220 is the encryption key that was used to form encrypted data that currently exists in the partitions of table 200. New encryption key 222 represents an encryption key that will be used to re-encrypt the values in the partitions of table 200. Under cryptography guidelines, encryption keys are not to be held, but instead are to be retrieved only as long as necessary to be used. Thus, under the cryptography guidelines, the encryption keys should be retrieved for each record individually and then discarded. However, performing encryption key handling for each record greatly increases the amount of time required to encrypt and de-encrypt partitions of a table. As such, in the embodiments described herein, the encryption keys are retrieved once and held for all records of a partition file. While this is less secure than retrieving the encryption key for each record, it reduces the time required to re-encrypt the data values from 5 hours to 25 minutes.

At step 112, unload/load control 210 reads a record from the partition unload file 216 of the selected partition. The record includes an encrypted value. At step 114, unload/load control 210 passes the encrypted value and the old encryption key 220 to a decryption algorithm 224, which decrypts the value using the key and returns a decrypted value to unload/load control 210. Unload/load control 210 then passes the decrypted value and the new encryption key 222 to an encryption algorithm 226 at step 116. Encryption algorithm 226 encrypts the decrypted value using the new encryption key and returns a re-encrypted value to load/unload control 210. At step 118, unload/load control 210 replaces the encrypted value in the record with the re-encrypted value to form a new record and writes the new record to the partition load file 218 created at step 108.

At step 120, unload/load control 210 determines if the current partition unload file 216 contains more records. If it contains more records, the process returns to step 112 to read the next record from the partition unload file 216. Steps 114, 116 and 118 are then repeated for the encrypted value of the new record.

When there are no more records in the current partition unload file 216, the process continues at step 122 where the partition unload file is closed and deallocated and the partition load file 218 is closed.

At step 124, unload/load control 210 determines if there are more unloaded partition files 216. If there are more unloaded partition files, the process returns to step 106 to select the next partition number from punch file 214. Steps 108-122 are then repeated for the new partition. When there are no more unloaded partitions at step 124, a separate partition load file 218 has been formed for each partition unload file 216. The partition load files contain the same records as the partition unload files with the exception that the encrypted values in the partition load files have been formed by decrypting encrypted values in the partition unload files and re-encrypting the values using a new encryption key.

Figure 4:
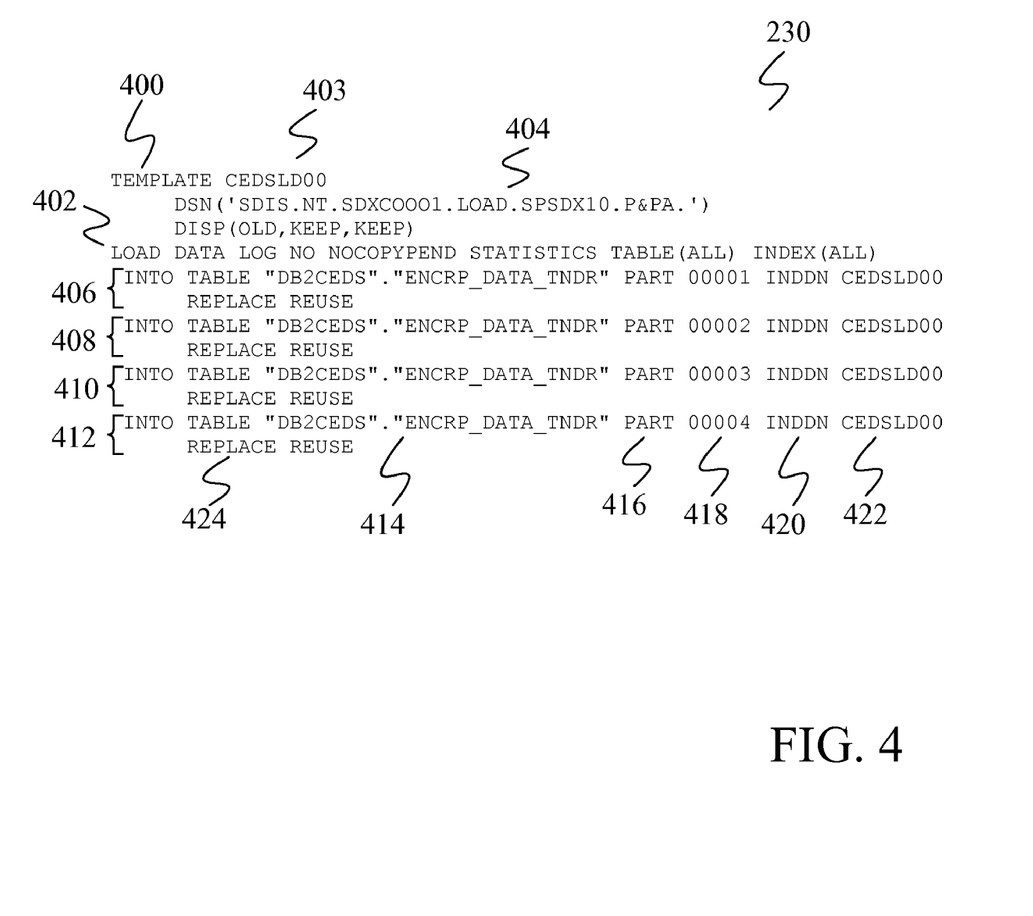
FIG. 4 is an example of a new punch file written to load files to a partitioned table.

At step 126, unload/load control 210 forms a new punch file 230 based on the information in punch file 214. FIG. 4 provides an example of a new punch file 230 formed by unload/load control 210. Punch file 230 provides instructions for loading records from the partition load files 218 to the partitions of the table and includes a TEMPLATE utility instruction 400 and a LOAD utility instruction 402. TEMPLATE utility instruction 400 includes a template name 403 that is used to reference the template and a filename template 404 that describes the filename of the partition load files 218. This template filename is formed by taking filename 306 of initial punch file 214 and changing the term "UNLD" to "LOAD" under some embodiments. In other embodiments, the template filename may be formed by removing portions of the template filename 306, adding portions to the template filename 306, or forming a completely different template filename.

The LOAD utility instruction includes a separate INTO TABLE statement for each partition. For example, for the four partitions shown in FIG. 4, INTO TABLE statement 406, 408, 410 and 412 are provided. Each INTO TABLE statement includes an identification of the table such as identification 414 that indicates the name of the table that is to receive the data. In FIG. 4, the name of the table is DB2CEDS.ENCRP_DATA_TNDR. The INTO TABLE statement also includes a partition keyword (PART) 416, and partition value 418. Partition value 418 is used in place of &PA in filename template 404 to provide the filename of the partition load files 218 from which the data to be placed in the partition of the table. Partition value 418 is also used by job execution 212 to identify the partition in which the data should be placed. The INTO TABLE statements also include an input name keyword 420 that has a value 422 that identifies the name 403 of TEMPLATE instruction 400. During execution of the TEMPLATE-LOAD job 230 of FIG. 4, job execution 212 replaces the reference to template name 403 with filename template 404 and replaces the &PA variable in filename 404 with the partition number 418. It then uses this filename as the filename of the file containing records that are to be loaded into the partitions of the database.

The INTO TABLE statements also include a REPLACE keyword that indicates that the records of the partition load file are to replace the existing records in the partition of table 200. This REPLACE keyword is inserted after the INTO TABLE statements so that the replace is performed on a partition basis. By performing the replace on a partition basis, if the load fails, only the partitions listed in range of partitions of the UNLOAD instruction are affected. As a result, the LOAD only needs to be repeated for those partitions and not for the entire table.

New punch file 230 does not include WHEN statements for each INTO TABLE statement. As a result, the INTO TABLE statements of new punch file 230 are much more efficient than those produced by the UNLOAD utility.

After new punch file 230 has been formed, unload/load control 210 passes new punch file 230 to job execution 212, which executes the TEMPLATE and LOAD utilities in new punch file 230 at step 128 to replace the records of the partitions in table 200 with the records in partition load files 218.

At step 130, unload/load control 210 determines if there are more partition ranges to be re-encrypted. If there are more partition ranges, the process returns to step 100 and steps 102-128 are repeated for a new partition range. When all the partition ranges have been processed at step 130, the process ends at step 132.

Figure 5:
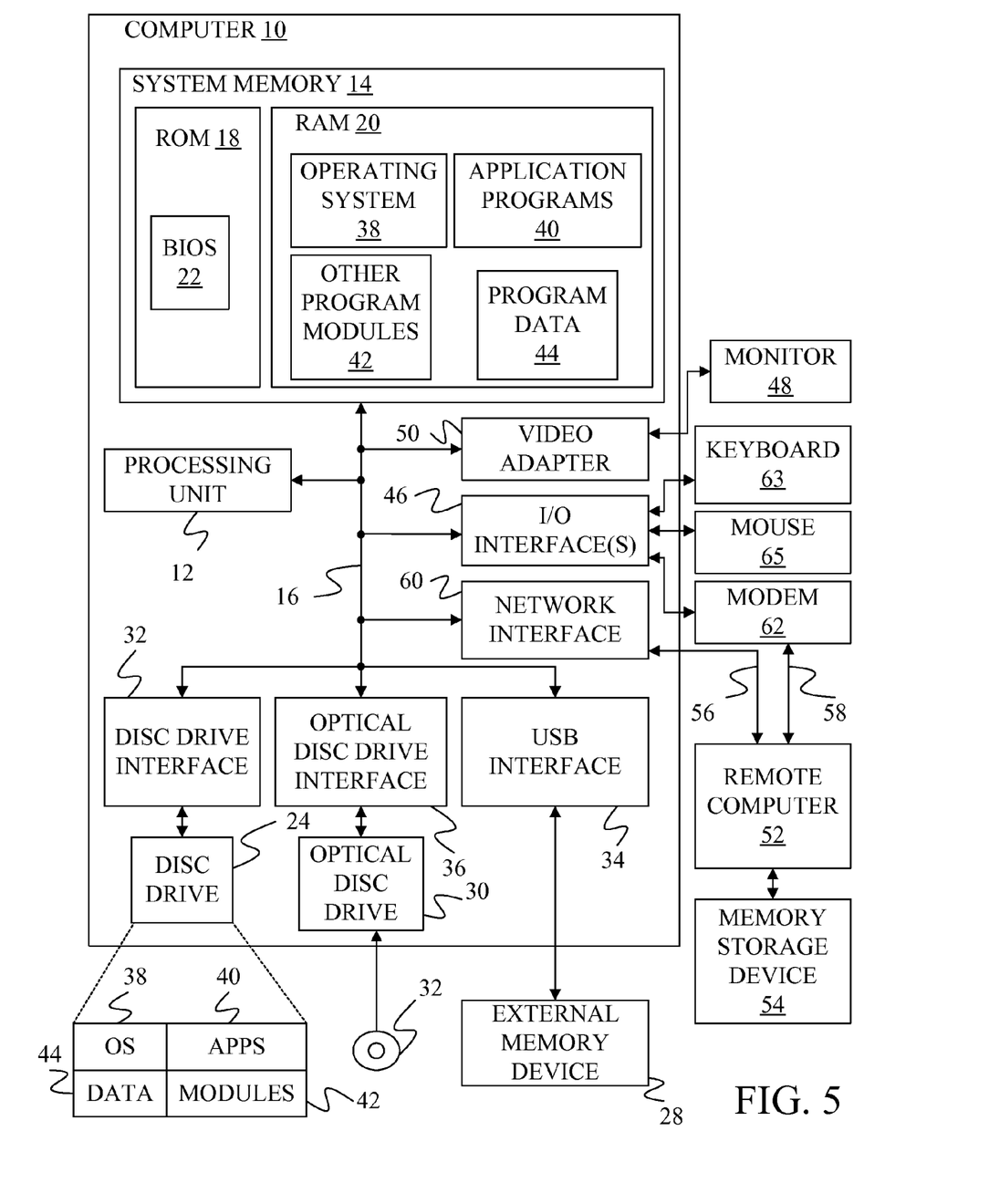
FIG. 5 is a block diagram of a general computing environment in which embodiments may be practiced.

An example of a computing device that can be used as a server or client device is shown in the block diagram of FIG. 5. The computing device 10 of FIG. 5 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage for the personal computer 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include any of the control programs, modules or utilities discussed above and program data 44 may include data stored in any of the databases, datasets or files discussed above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 8. The network connections depicted in FIG. 8 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 8 are exemplary and other means for establishing a communications link between the computers, such as a wireless interface communications link, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   unloading a table divided into partitions such that each partition is unloaded into a separate unload file and such that an instruction file including instructions for loading records from the unload files into the table is generated;
   accessing the instruction file to determine the names of the unload files;
   for each unload file:
   creating a name for a load file by partially altering the name of the unload file read from the instruction file;
   creating the load file;
   reading data from the unload file;

changing at least one part of the data to form changed data, wherein changing at least one part of the data comprises:
retrieving an old encryption key;
decrypting a value in the data using the old encryption key to form a decrypted value;
retrieving a new encryption key;
encrypting the decrypted value using the new encryption key to form a value in the changed data;
writing the changed data to the load file; and
writing a load instruction file including instructions for loading records from the load files to the table.

2. The method of claim 1 wherein writing a load instruction file comprises writing a separate keyword for each partition to replace data in the partition of the table.

3. The method of claim 1 wherein accessing the instruction file to determine the name of the unload file comprises accessing a filename template that uses a variable as part of the name.

4. The method of claim 3 wherein the variable represents a partition number.

5. The method of claim 4 wherein creating a name for a load file further comprises substituting a partition number for the variable.

6. The method of claim 1 wherein retrieving the old encryption key and the new encryption key comprises retrieving the old encryption key and the new encryption key once for an unload file and maintaining the old encryption key and the new encryption key in memory.

7. The method of claim 1 wherein writing a load instruction file comprises not including WHEN statements present in the instruction file in the load instruction file.

8. A computer-readable medium having computer-executable instructions encoded thereon for performing steps comprising:
calling a database utility to transfer data from partitions of a table to a set of output files, each partition having a separate output file, and each output file having a file name that is based in part on the partition;
accessing an initial punch file created by the database utility that indicates the names of each output file and that includes instructions for a database utility to load data from the output files to the partitions of the table;
using the names of the output files determined from the punch file to create input files;
reading data from the output files;
modifying the data read from the output files, wherein modifying the data comprises:
retrieving an old encryption key;
decrypting a value in the data using the old encryption key to form a decrypted value;
retrieving a new encryption key;
encrypting the decrypted value using the new encryption key to form a value in modified data;
writing the modified data to the input files;
creating a second punch file that indicates the names of the input files and that includes instructions for the database utility to load data from the input files to the partitions of the table, the instructions comprising instructions to replace records in the table with data in the input files;
executing the instructions in the second punch file to load the input files to the partitions of the table.

9. The computer-readable medium of claim 8 wherein the instructions in the initial punch file lack an instruction to replace records in the table with data in the output files.

10. The computer-readable medium of claim 8 wherein the initial punch file indicates the names of each output file by indicating a filename template having a partition variable and indicating a partition value for each output file.

11. The computer-readable medium of claim 8 wherein using the names of the output files to create input files comprises naming the input files such that a partition value forms part of the name.

12. The computer-readable medium of claim 8 wherein instructions in the second punch file are more efficient for loading data in the partitions of the table than instructions in the initial punch file.

13. The computer-readable medium of claim 12 wherein the instructions in the initial punch file comprise WHEN statements and wherein the instructions in the second punch file do not include WHEN statements.

14. A method comprising:
accessing a set of instructions that comprises instructions for loading partitions of a table with data from a first set of files to determine the names of the first set of files;
using the names of the first set of files to form a second set of files by modifying the names of the first set of files;
modifying data from the first set of files to form modified data and storing the modified data in the second set of files, wherein modifying the data comprises:
retrieving a first encryption key;
decrypting a value in the data using the first encryption key to form a decrypted value;
retrieving a second encryption key;
encrypting the decrypted value using the second encryption key to form a value in the modified data;
creating a second set of instructions that comprise instructions for loading the partitions of the table with data from the second set of files.

15. The method of claim 14 wherein accessing the set of instructions to determine the names of the first set of files comprises accessing a template instruction to determine a filename template comprising at least one variable.

16. The method of claim 15 wherein the at least one variable represents a partition.

17. The method of claim 14 wherein creating the second set of instructions comprises including instructions for replacing data in the table on a partition basis.

* * * * *